US012623194B2

(12) United States Patent
Kauppi et al.

(10) Patent No.: US 12,623,194 B2
(45) Date of Patent: May 12, 2026

(54) DOUBLE SHAFT PADDLE MIXER AND ARRANGEMENT AND METHODS FOR PRODUCING PASTE

(71) Applicant: Metso Finland Oy, Espoo (FI)

(72) Inventors: Janne Kauppi, Taipalsaari (FI); Vesa Koponen, Taavetti (FI)

(73) Assignee: Metso Finland Oy, Espoo (FI)

(*) Notice: Subject to any disclaimer, the term of this patent is extended or adjusted under 35 U.S.C. 154(b) by 944 days.

(21) Appl. No.: 17/789,679

(22) PCT Filed: Dec. 31, 2019

(86) PCT No.: PCT/FI2019/050937

§ 371 (c)(1),
(2) Date: Jun. 28, 2022

(87) PCT Pub. No.: WO2021/136871

PCT Pub. Date: Jul. 8, 2021

(65) Prior Publication Data

US 2023/0034738 A1 Feb. 2, 2023

(51) Int. Cl.
*B01F 33/80* (2022.01)
*B01F 23/50* (2022.01)
(Continued)

(52) U.S. Cl.
CPC ........ *B01F 33/83612* (2022.01); *B01F 23/53* (2022.01); *B01F 23/565* (2022.01);
(Continued)

(58) Field of Classification Search
CPC .......................... B01F 27/625; B01F 33/83612
See application file for complete search history.

(56) References Cited

U.S. PATENT DOCUMENTS

| | | | | |
|---|---|---|---|---|
| 7,004,616 | B2 * | 2/2006 | Murakami .............. | B29C 48/54 366/76.2 |
| 7,635,217 | B2 * | 12/2009 | Rokey ..................... | B29B 7/481 366/85 |

(Continued)

FOREIGN PATENT DOCUMENTS

| | | | |
|---|---|---|---|
| CN | 106745157 | B | 7/2018 |
| JP | 2000355930 | A | 12/2000 |

(Continued)

OTHER PUBLICATIONS

International Search Report and Written Opinion for PCT Application PCT/FI2019/050937, mailed Mar. 27, 2020.

(Continued)

*Primary Examiner* — Elizabeth Insler
(74) *Attorney, Agent, or Firm* — Andrus Intellectual Property Law, LLP

(57) ABSTRACT

A double shaft paddle mixer, including a barrel chamber, and a first paddle screw and a second paddle screw. The first paddle screw is provided with first paddles and the second paddle screw is provided with second paddles. The barrel chamber includes a crushing zone and a mixing zone. The crushing zone is partly separated from the mixing zone by a partition member. A first inlet is connected to the crushing zone and a second inlet is connected to the mixing zone and
(Continued)

Figure 1:
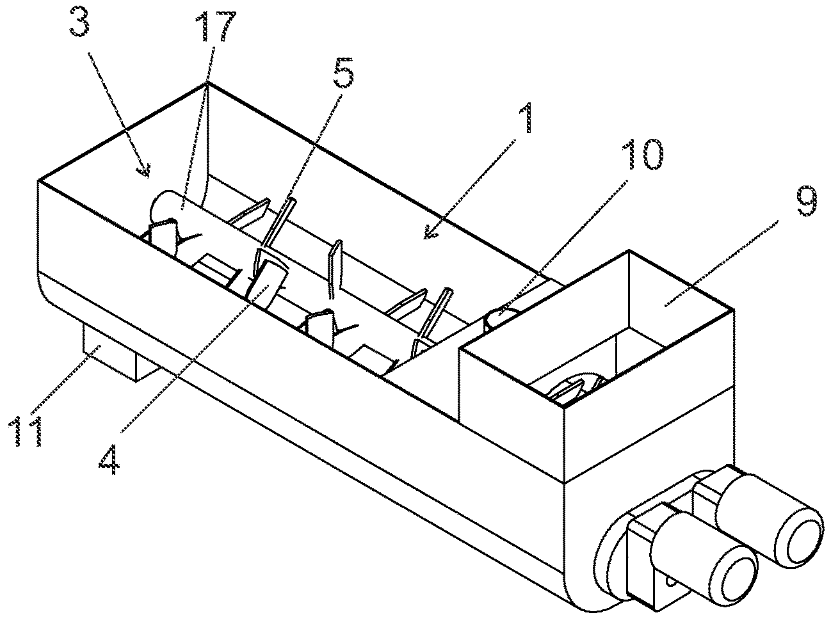

an outlet connected to the mixing zone. The double shaft paddle mixer can be part of an arrangement and part of a method for producing paste.

22 Claims, 4 Drawing Sheets

(51) Int. Cl.

| | |
|---|---|
| ***B01F 23/53*** | (2022.01) |
| ***B01F 23/70*** | (2022.01) |
| ***B01F 27/112*** | (2022.01) |
| ***B01F 27/171*** | (2022.01) |
| ***B01F 27/60*** | (2022.01) |
| ***B01F 27/702*** | (2022.01) |
| ***B01F 33/83*** | (2022.01) |
| ***B01F 35/511*** | (2022.01) |
| ***B02C 18/14*** | (2006.01) |
| ***B02C 23/14*** | (2006.01) |
| *B01F 101/50* | (2022.01) |

(52) U.S. Cl.

CPC ............ *B01F 23/59* (2022.01); *B01F 23/704* (2022.01); *B01F 23/708* (2022.01); *B01F 27/112* (2022.01); *B01F 27/171* (2022.01); *B01F 27/625* (2022.01); *B01F 27/702* (2022.01); *B01F 33/8305* (2022.01); *B01F 33/833* (2022.01); *B01F 35/511* (2022.01); *B02C 18/142* (2013.01); *B02C 23/14* (2013.01); *B01F 2101/50* (2022.01); *B01F 2215/0422* (2013.01); *B01F 2215/0431* (2013.01)

(56) References Cited

U.S. PATENT DOCUMENTS

| | | | |
|---|---|---|---|
| 2014/0269148 | A1 | 9/2014 | Takemoto et al. |
| 2015/0273731 | A1 | 10/2015 | Fleury et al. |

FOREIGN PATENT DOCUMENTS

| | | | |
|---|---|---|---|
| JP | 2001342621 | A | 12/2001 |
| JP | 2013249645 | A | 12/2013 |
| SU | 925637 | A1 | 5/1982 |
| SU | 1357667 | A2 | 12/1987 |

OTHER PUBLICATIONS

International Preliminary Report on Patentability for PCT Application PCT/FI2019/050937, mailed Sep. 9, 2020.

Supplementary European Search Report for European Application No. 19886076 dated Sep. 14, 2023.

* cited by examiner

DOUBLE SHAFT PADDLE MIXER AND ARRANGEMENT AND METHODS FOR PRODUCING PASTE

CROSS-REFERENCE TO RELATED APPLICATIONS

This application is the U.S. national stage application of International Application PCT/FI2019/050937, filed Dec. 31, 2019, which international application was published on Jul. 8, 2021, as International Publication WO 2021/136871 A1 in the English language.

FIELD

The invention relates to a double shaft paddle mixer as defined in the preamble of independent claim 1.

The invention relates also to and arrangement methods for producing paste.

OBJECTIVE

The object is to provide a double shaft paddle mixer that is capable of making fluid such as paste or slurry of pieces comprising particulate material such as finer clay, silt, filtered solids, or sand sized material, which pieces having a size that can be between 50 and 400 mm.

SHORT DESCRIPTION

The idea is based on dividing the barrel chamber of the double shaft paddle mixer into a crushing zone and a mixing zone by means of a partition member preventing pieces of comprising particulate material having a too large size from exiting the crushing zone and enter the mixing zone. A first inlet that can be capable of receiving pieces comprising particulate material, which pieces having a size between 100 and 200 mm is connected to an upstream region of the crushing zone of the barrel chamber and a second inlet that can be configured to receive fluid such as liquid, suspension or slurry is connected to an upstream region of the mixing zone of the barrel chamber. Because the average paddle angle of the first paddles and of the second paddles with respect to the centerline of the first paddle screw and of the second paddle screw is larger in the mixing zone of the barrel chamber than in the crushing zone of the barrel chamber, the material that is fed into the crushing zone of the barrel chamber via the first inlet will move slower in the crushing zone of the barrel chamber than material in the mixing zone of the barrel chamber, after said material having been shredded in the crushing zone of the barrel chamber and having entered the mixing zone of the barrel chamber and after fluid being added to said material via the second inlet. The result of this is an increased residence time in the crushing zone of the barrel chamber which is an advantage, because the size of the pieces that exits the crushing zone of the barrel chamber to enter the mixing zone of the barrel chamber must be small enough to pass the partition member between the crushing zone and the mixing zone. The crushing in the crushing zone can be autogenous.

LIST OF FIGURES

Figure 2:
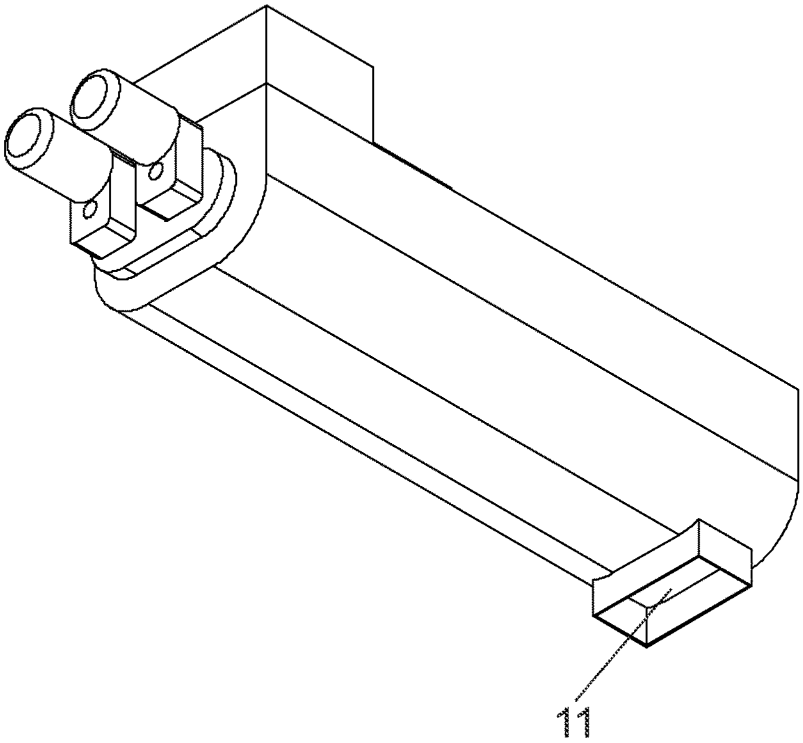
Figure 3:
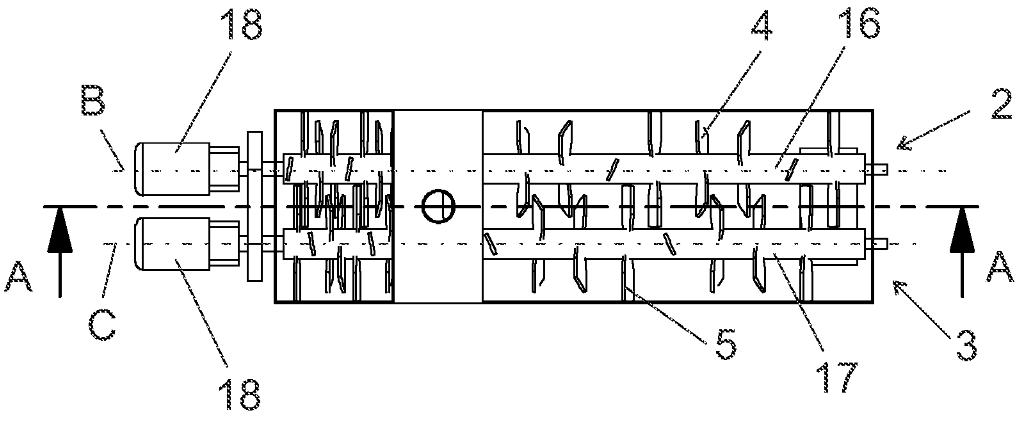
Figure 4:
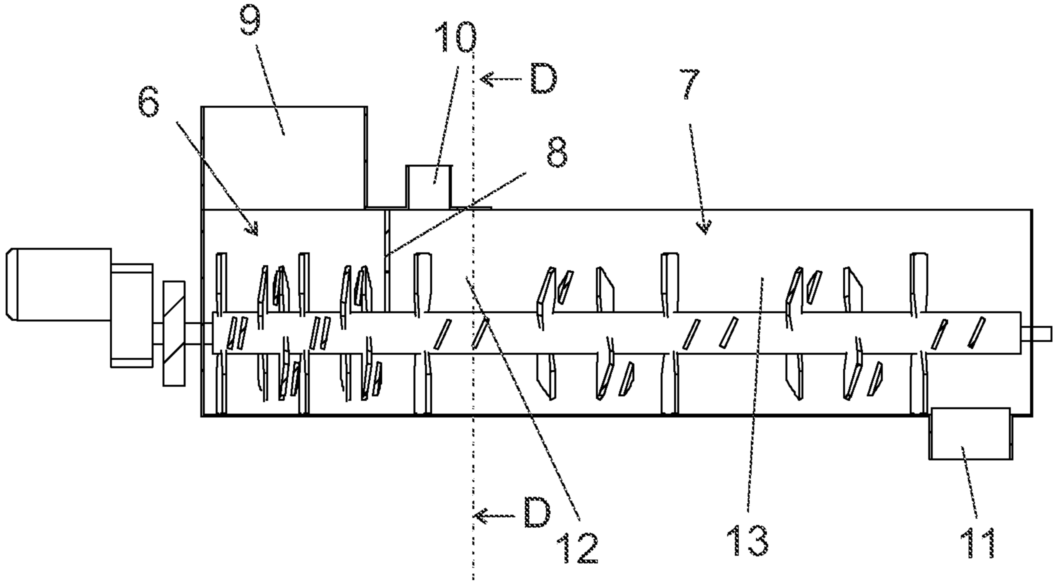
Figure 5:
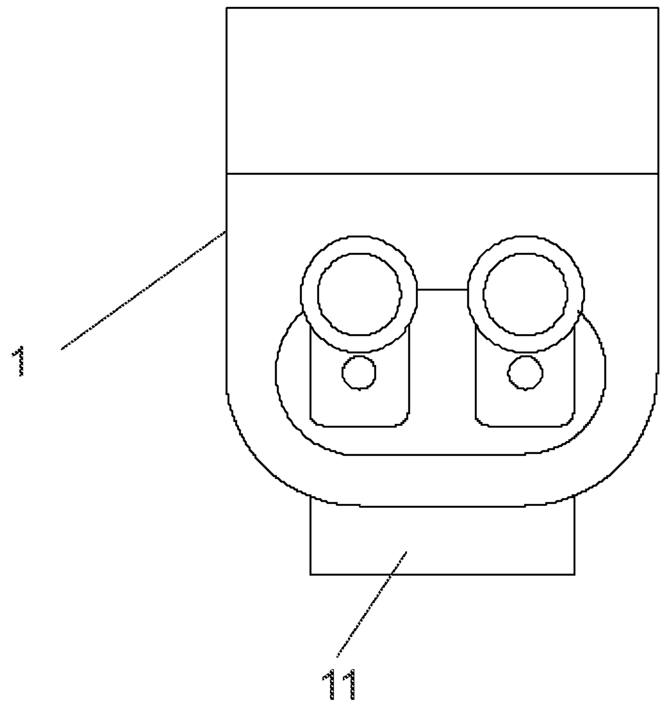
Figure 6:
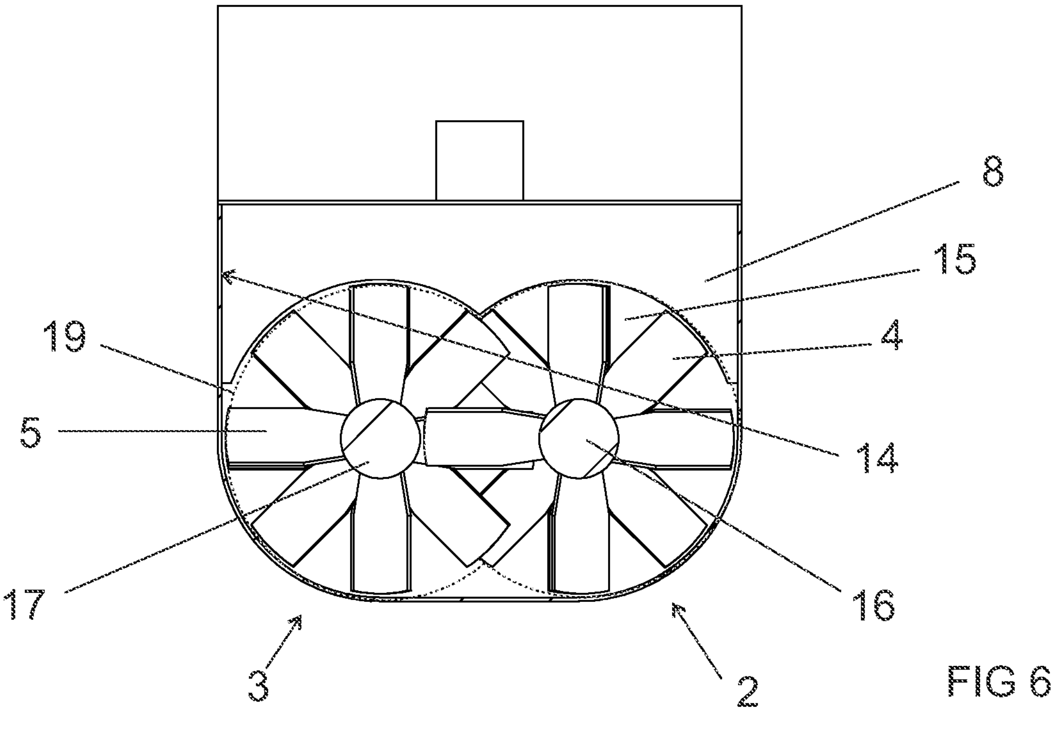
Figure 7:
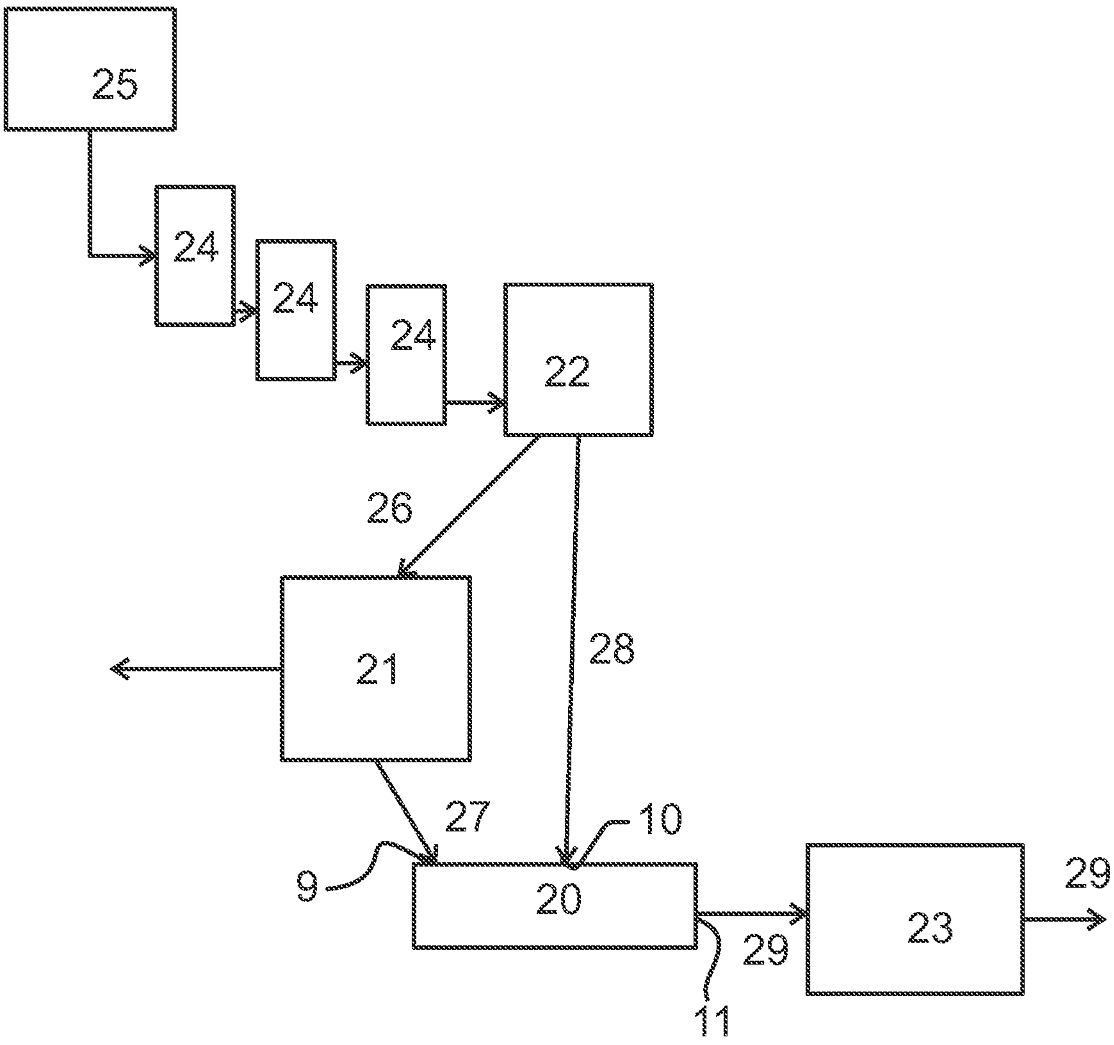

In the following the double shaft paddle mixer will described in more detail by referring to the figures of which FIG. 1 shows an embodiment of the double shaft paddle mixer, FIG. 2 shows the double shaft paddle mixer shown in FIG. 1 from another angle, FIG. 3 shows the double shaft paddle mixer shown in FIG. 1 as seen from above, FIG. 4 shows the double shaft paddle mixer shown in FIG. 1 as cut along plane A-A in FIG. 3, FIG. 5 shows the double shaft paddle mixer shown in FIG. 1 as seen from one end, FIG. 6 shows the double shaft paddle mixer shown in FIG. 1 as cut along plane D-D in FIG. 4, and FIG. 7 is a flow sheet of an embodiment for producing paste.

DETAILED DESCRIPTION

The figures show an embodiment of the double shaft paddle mixer.

The double shaft paddle mixer comprising a barrel chamber 1 that is elongated and that extends axially.

The double shaft paddle mixer comprising a first paddle screw 2 and a second paddle screw 3 configured to rotate together in the barrel chamber 1 in an intermeshing relationship. For the rotation of the first paddle screw 2 and the second paddle screw 3 can either a common or separate rotation means 18 such as electric motors be provided.

The first paddle screw 2 is provided with first paddles 4 and the second paddle screw 3 is provided with second paddles 5.

The barrel chamber 1 comprises a crushing zone 6 and a mixing zone 7 so that the crushing zone 6 is partly separated from the mixing zone 7 by a partition member 8. In other words, the partition member 8 is arranged in the barrel chamber 1 so that a limited passage 15 is provided at the partition member 8 between the crushing zone 6 of the barrel chamber 1 and the mixing zone 7 of the barrel chamber 1. The purpose of the limited passage 15 is to prevent that pieces having a too large size moves from the crushing zone 6 of the barrel chamber 1 to the mixing zone 7 of the barrel chamber 1. This assures that the first paddles 4 of the first paddle screw 3 and that the second paddles 5 of the second paddle screw 3 have to a sufficient degree fine-divided the matter that passes through the limited passage 15 at the partition member when matter exits the crushing zone 6 of the barrel chamber 1 and to enter the mixing zone 7 of the barrel chamber 1

The thickness of the first paddles 4 and the second paddles 5 is preferably, but not necessarily, between 10 and 40 mm at least in the crushing zone 6 of the barrel chamber 1 to provide for effective crushing effect by hitting the pieces comprising particulate material in the crushing zone 6 of the barrel chamber as the first paddle screw 2 and the second paddle screw 3 rotates.

A first inlet 9 is connected to an upstream region of the crushing zone 6 of the barrel chamber 1, and a second inlet 10 is connected to an upstream region of the mixing zone 7 of the barrel chamber 1 and an outlet 11 connected to a downstream region of the mixing zone 7 of the barrel chamber 1.

The average paddle angle of the first paddles 4 with respect to the centerline of the first paddle screw 2 and of the second paddles 5 with respect to the centerline of the second paddle screw 3 is larger in the mixing zone 7 than in the crushing zone 6.

The first paddles 4 of the first paddle screw 2 are configured by rotating, and the second paddles 5 of the second paddle screw 3 are configured by rotating to move matter present in the barrel chamber 1 from the upstream end of the crushing zone 6 towards the downstream end of the mixing zone 7.

The average paddle angle in crushing zone 6 can for example be between 1 and 10°, preferably between 2.5 and 7.5°, such as about 5°.

The average paddle angle in mixing zone 7 can for example be between 5 and 25°, preferably between 1° and 20°, such as between 5 and 15°.

The mixing zone 7 of the barrel chamber 1 can comprise a fluid adding zone 12 and a homogenization zone 13 so that the fluid adding zone 12 extends between the partition member 8 and the second inlet 10, and so that the homogenization zone 13 extends between the fluid adding zone 12 and the outlet 11. If the mixing zone 7 of the barrel chamber 1 comprises such fluid adding zone 12 and such homogenization zone 13, the relative number of first paddles 4 and of second paddles 5 as calculated along the first rotation axis A of the first paddle screw 2 and as calculated along the second rotation axis B of the second paddle screw 3 is preferably, but not necessarily, larger in the homogenization zone 13 than in the mixing zone 7. If the mixing zone 7 of the barrel chamber 1 comprises such fluid adding zone 12 and such homogenization zone 12, the average paddle angle of the first paddles 4 and of the second paddles 5 with respect to the centerline of the first paddle screw 2 and of the second paddle screw 3 is preferably, but not necessarily, larger in the homogenization zone 13 than in the mixing zone 7.

The relative number of first paddles 4 and of second paddles 5 as calculated along the first rotation axis A of the first paddle screw 2 and as calculated along the second rotation axis B of the second paddle screw 3 is preferably, but not necessarily, larger in the crushing zone 6 of the barrel chamber 1 than in the mixing zone 7 of the barrel chamber 1.

The first paddle screw 2 and the second paddle screw 3 extend preferably, but not necessarily, in parallel in the barrel chamber 1, and the first paddle screw 2 and the second paddle screw 3 are preferably, but not necessarily, configured to rotate in opposite directions about their rotational axis.

The partition member 8 extends preferably, but not necessarily, from an inner surface 14 limiting the barrel chamber 1, so that the limited passage 15 provided at the partition member 8 between the crushing zone 6 of the barrel chamber 1 and the mixing zone 7 of the barrel chamber 1 essentially correspond to the cross section of the shape 19 the first paddle screw 2 and the second paddle screw 3 together have as they rotates in the barrel chamber 1 as illustrated in FIG. 6. This to ensure that the pieces comprising particulate material have been crushed to a sufficient degree before the pieces can pass the partition member 8 and travel from the crushing zone 6 of the barrel chamber 1 to the mixing zone 7 of the barrel chamber 1.

The size of the first paddles 4 of the first paddle screw 2 is preferably, but not necessarily, selected so that the first paddles 4 extend 100 to 400 mm from the first shaft 16 of the first paddle screw 2 to achieve effective crushing and mixing action. The size of the second paddles 5 of the second paddle screw 3 is preferably, but not necessarily, selected so that the second paddles 5 extend 100 to 400 mm from the first second 17 of the second paddle screw 3 to achieve effective crushing and mixing action.

At least some of first blades are preferably, but not necessarily, at least partly paddle shaped, propeller blade shaped, or curved.

At least some of the second blades are preferably, but not necessarily, at least partly paddle shaped, propeller blade shaped, or curved.

The first inlet 9 has preferably, but not necessarily, an opening capable of receiving pieces having a size between 100 and 200 mm. The first inlet 9 provided a passage that leads to the barrel chamber 1 of the double shaft paddle mixer.

The second inlet 10 can be in fluid connection with a source for fluid (not shown in the figures) such as liquid, suspension or slurry. The second inlet 10 provided a passage that leads to the barrel chamber 1 of the double shaft paddle mixer.

The partition member 8 is preferably, but not necessarily, adjustable arranged in the barrel chamber 1 so at to adjust the size and/or form of the limited passage 15 at the partition member 8 between the crushing zone 6 of the barrel chamber 1 and the mixing zone 7 of the barrel chamber 1.

The partition member 8 is preferably, but not necessarily, releasable arranged in the barrel chamber 1 so as to allow changing or replacing of the partition member 8 with another partition member. The other partition member 8 can for example be configured to provide a limited passage 15 having another size and/or form of the limited passage 15 at the partition member 8 between the crushing zone 6 of the barrel chamber 1 and the mixing zone 7 of the barrel chamber 1. A need to replace the partition member 8 can also arise if the partition member 8 wears due to erosion with the result that the size and/or form of the limited passage 15 at the partition member 8 between the crushing zone 6 of the barrel chamber 1 and the mixing zone 7 of the barrel chamber 1 changes.

The first paddle screw 2 and the second paddle screw 3 are preferably, but not necessarily, mirror identical.

The double shaft paddle mixer is preferably, but not necessarily, essentially completely made of metal such as of steel.

At least one of the crushing zone 6 and the mixing zone 7 of the barrel chamber 1 can have an at least partly replaceable inner lining (not illustrated).

At least one of the fluid adding zone 12 and the mixing zone 7 of the barrel chamber 1 having third inlet for adding chemical to enhance viscosity of paste produced with the double shaft paddle mixer.

Next an arrangement for producing fluid such as paste or slurry will be described in greater detail.

The arrangement comprising a filter press 21 for dehydrating feeding material 26, and a double shaft paddle mixer 20 that can be in the form of any embodiment presented. A first inlet 9 of the double shaft paddle mixer 20 is in fluid connection with the filter press 21 and configured to receive pieces of particulate material 26 from the filter press 21. The filter press 21 is in fluid connection with a gravity-based separator 22

The arrangement can comprise a tank 23 for paste 29 in fluid connection with an outlet 11 of the double shaft paddle mixer 20.

The gravity-based separator 22 can be part of a mineral beneficiation flotation arrangement, wherein the filter press 21 is in fluid connection with gravity-based separator 22 that is in fluid connection with the last flotation vessel 24 in a series of flotation vessels 24 and wherein the first flotation vessel 24 in said series of floatation vessels 24 is in fluid connection with a grinder 25. The gravity-based separator 22 can be in fluid connection the fluid adding zone 12 of the barrel chamber 1 of the double shaft paddle mixer 20 via a second inlet 10 of the double shaft paddle mixer 20.

Next the method for producing fluid such as paste or slurry and some embodiments of the method will be described in greater detail.

The method comprises feeding material 26 to be dehydrated to a filter press 21 from the gravity-based separator 22.

The method can comprise feeding material 26 to be dehydrated to a filter press 21 from the gravity-based separator 22 of a mineral beneficiation flotation arrangement, wherein the filter press 21 is in fluid connection with the last flotation vessel 24 in a series of flotation vessels 24 and wherein the first flotation vessel 24 in said series of floatation vessels 24 is in fluid connection with a grinder 25.

The method comprises producing particulate material in the filter press 21.

The method comprises breaking said particulate material into pieces of particulate material 26.

The method comprises feeding said pieces of particulate material into a crushing zone 6 of a barrel chamber 1 of the double shaft paddle mixer 20 via a first inlet 9 of the double shaft paddle mixer 20.

The method comprises crushing said pieces of particulate material in the crushing zone 6 of the barrel chamber 1 of the double shaft paddle mixer 20 to produce crushed pieces of particulate material in the double shaft paddle mixer 20.

The method comprises moving crushed pieces of particulate material in the double shaft paddle mixer 20 from the crushing zone 6 into a fluid adding zone 12 of the barrel chamber 1 of the double shaft paddle mixer 20.

The method comprises feeding fluid into the fluid adding zone 12 of the barrel chamber 1 of the double shaft paddle mixer 20 via a second inlet 10 of the double shaft paddle mixer 20.

The method comprises feeding fluid from the gravity-based separator 22 into the fluid adding zone 12 of the barrel chamber 1 of the double shaft paddle mixer 20 via a second inlet 10 of the double shaft paddle mixer 20.

The method comprises mixing fluid and crushed pieces of particulate material in the fluid adding zone 12 of the double shaft paddle mixer 20 while moving fluid and crushed pieces of particulate material from the fluid adding zone 12 of the double shaft paddle mixer 20 to a homogenization zone 13 of the barrel chamber 1 of the double shaft paddle mixer 20 to produce paste 29 of fluid and crushed pieces of particulate material in the homogenization zone 13 of the barrel chamber 1 of the double shaft paddle mixer 20.

The method comprises discharging paste 29 from the homogenization zone 13 of the barrel chamber 1 of the double shaft paddle mixer 20 to the outside of the barrel chamber 1 of the double shaft paddle mixer 20 via an outlet 11 of the double shaft paddle mixer 20.

Next an alternative method for producing fluid such as paste or slurry and some embodiments of the method will be described in greater detail.

The alternative method comprises providing a double shaft paddle mixer 20 according to any embodiment presented earlier.

The method comprises feeding material 26 to be dehydrated to a filter press 21 from a gravity-based separator 22. The method comprises preferably, but not necessarily, feeding material 26 to be dehydrated to a filter press 21 from a gravity-based separator 22 of a mineral beneficiation flotation arrangement, wherein the filter press 21 is in fluid connection with the last flotation vessel 24 in a series of flotation vessels 24 and wherein the first flotation vessel 24 in said series of floatation vessels 24 is in fluid connection with a grinder 25.

The method comprises producing particulate material in the filter press 21.

The method comprises breaking said particulate material into pieces of particulate material 26.

The method comprises feeding said pieces of particulate material into the crushing zone 6 of the barrel chamber 1 of the double shaft paddle mixer 20 via the first inlet 9 of the double shaft paddle mixer 20.

The method comprises crushing said pieces of particulate material in the crushing zone 6 of the barrel chamber 1 of the double shaft paddle mixer 20 to produce crushed pieces of particulate material in the double shaft paddle mixer 20.

The method comprises moving crushed pieces of particulate material in the double shaft paddle mixer 20 from the crushing zone 6 into the mixing zone 7 of the barrel chamber 1 of the double shaft paddle mixer 20.

The method comprises feeding fluid into the mixing zone 7 of the barrel chamber 1 of the double shaft paddle mixer 20 via the second inlet 10 of the double shaft paddle mixer 20.

The method can comprise feeding fluid from the gravity-based separator 22 into the mixing zone 7 of the barrel chamber 1 of the double shaft paddle mixer 20 via the second inlet 10 of the double shaft paddle mixer 20.

The method comprises mixing fluid and crushed pieces of particulate material in the mixing zone 7 of the double shaft paddle mixer 20 while moving fluid and crushed pieces of particulate material in the mixing zone 7 of the double shaft paddle mixer 20 to produce paste 29 of fluid and crushed pieces of particulate material in the mixing zone 7 of the barrel chamber 1 of the double shaft paddle mixer 20.

The method comprises discharging paste 29 from the mixing zone 7 of the barrel chamber 1 of the double shaft paddle mixer 20 to the outside of the barrel chamber 1 of the double shaft paddle mixer 20 via an outlet 11 of the double shaft paddle mixer 20.

The methods can include feeding the paste to a tank 23 for paste 29.

The particulate material 27 has preferably, but not necessarily, a residual moisture between 10 and 25%.

The fluid 28 has preferably, but not necessarily, a residual moisture between 30 and 50%. The paste 29 has preferably, but not necessarily, a moisture between 25 and 30%.

It is apparent to a person skilled in the art that as technology advances, the basic idea of the invention can be implemented in various ways. The invention and its embodiments are therefore not restricted to the above examples, but they may vary within the scope of the claims.

The invention claimed is:

1. A double shaft paddle mixer, comprising:

a barrel chamber that is elongated and that extends axially;

a first paddle screw and a second paddle screw configured to rotate together in the barrel chamber in an intermeshing relationship, the first paddle screw being provided with first paddles extending from a first shaft and the second paddle screw being provided with second paddles extending from a second shaft, the barrel chamber comprising a crushing zone and a mixing zone, the crushing zone being partly separated from the mixing zone by a partition member, a first inlet connected to an upstream region of the crushing zone, a second inlet being connected to an upstream region of the mixing zone and an outlet connected to a downstream region of the mixing zone, and wherein the average paddle angle of the first paddles with respect to the centerline of the first paddle screw and the second paddles with respect to the centerline of the second paddle screw is larger in the mixing zone than in the crushing zone, wherein the partition member extends from an inner surface of the barrel chamber, wherein a limited passage is provided at the partition member between the crushing zone of the barrel chamber and the mixing zone of the barrel chamber essentially correspond to the cross section of the shape the first paddle screw and the second paddle screw together form as they rotates in the barrel chamber, and wherein the relative number of first paddles and second paddles as calculated along a first rotation axis of the first paddle screw and as calculated along a second rotation axis of the second paddle screw is larger in the crushing zone than in the mixing zone.

2. The double shaft paddle mixer according to claim 1, wherein the average paddle angle in the crushing zone being between 1 and 10°.

3. The double shaft paddle mixer according to claim 1, wherein the average paddle angle in the mixing zone being between 5 and 25°.

4. The double shaft paddle mixer according to claim 1, wherein the mixing zone comprises a fluid adding zone and a homogenization zone, wherein the fluid adding zone extends between the partition member and the second inlet, and wherein the homogenization zone extends between the fluid adding zone and the outlet.

5. The double shaft paddle mixer according to claim 1, wherein the first paddle screw and the second paddle screw extend in parallel in the barrel chamber, and wherein the first paddle screw and the second paddle screw are configured to rotate in opposite directions about their rotational axis.

6. The double shaft paddle mixer according to claim 1 wherein at least some of first blades being at least partly paddle shaped, propeller blade shaped, or curved.

7. The double shaft paddle mixer according to claim 1 wherein at least some of the second blades being at least partly paddle shaped, propeller blade shaped, or curved.

8. The double shaft paddle mixer according to claim 1 wherein the first inlet has an opening capable of receiving pieces having a size between 100 and 200 mm.

9. The double shaft paddle mixer according to claim 1 wherein the second inlet is in fluid connection with a source for fluid such as liquid, suspension or slurry.

10. The double shaft paddle mixer according claim 1, wherein the partition member is adjustable arranged in the barrel chamber so at to adjust the size and/or form of the limited passage at the partition member between the crushing zone of the barrel chamber and the mixing zone of the barrel chamber.

11. The double shaft paddle mixer according to claim 1, wherein the partition member is releasable arranged in the barrel chamber.

12. The double shaft paddle mixer according to claim 1 wherein the first paddle screw and the second paddle screw are mirror identical.

13. The double shaft paddle mixer according to claim 1 wherein at least one of the crushing zone and the mixing zone of the barrel chamber have an at least partly replaceable inner lining.

14. The double shaft paddle mixer according to claim 1 wherein at least one of the fluid adding zone and the homogenization zone of the barrel chamber have a third inlet for adding a chemical.

15. The double shaft paddle mixer according to claim 1, wherein the average paddle angle in the crushing zone is between 2.5 and 7.5°.

16. The double shaft paddle mixer according to claim 1, wherein the average paddle angle in the crushing zone is about 5°.

17. The double shaft paddle mixer according to claim 1, wherein the average paddle angle in the mixing zone is between 1° and 20°.

18. The double shaft paddle mixer according to claim 1, wherein the average paddle angle in the mixing zone is between 1° and 15°.

19. An arrangement for producing fluid such as paste or slurry, wherein the arrangement comprising:

a filter press for dehydrating feeding material, wherein the filter press is in fluid connection with a gravity-based separator;

a double shaft paddle mixer according to claim 1; and wherein the first inlet of the double shaft paddle mixer is in fluid connection with the filter press and is configured to receive pieces of particulate material from the filter press.

20. The arrangement according to claim 19, further comprising a tank for paste in fluid connection with the outlet of the double shaft paddle mixer.

21. The arrangement according claim 19, wherein the gravity-based separator being part of a mineral beneficiation flotation arrangement, wherein the filter press is in fluid connection with gravity-based separator that is in fluid connection with a last flotation vessel in a series of flotation vessels and wherein a first flotation vessel in said series of floatation vessels is in fluid connection with a grinder.

22. The arrangement according to claim 19, wherein the gravity-based separator being in fluid connection the fluid adding zone of the barrel chamber of the double shaft paddle mixer via the second inlet of the double shaft paddle mixer.

* * * * *